(12) United States Patent
Tatsuka et al.

(10) Patent No.: US 8,699,807 B2
(45) Date of Patent: Apr. 15, 2014

(54) IMAGE CODING APPARATUS

(75) Inventors: Toshimitsu Tatsuka, Osaka (JP); Hiromu Hasegawa, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 72 days.

(21) Appl. No.: 13/577,488

(22) PCT Filed: Jan. 6, 2011

(86) PCT No.: PCT/JP2011/050123
§ 371 (c)(1), (2), (4) Date: Aug. 7, 2012

(87) PCT Pub. No.: WO2011/099315
PCT Pub. Date: Aug. 18, 2011

(65) Prior Publication Data
US 2012/0308151 A1 Dec. 6, 2012

(30) Foreign Application Priority Data

Feb. 10, 2010 (JP) .................................. 2010-027946

(51) Int. Cl.
*G06K 9/36* (2006.01)
*G06K 9/46* (2006.01)

(52) U.S. Cl.
USPC ....................................................... 382/238

(58) Field of Classification Search
USPC ................. 382/232, 233, 238, 250, 276, 294; 375/240.01, 240.12, 240.26; 348/699, 348/700
See application file for complete search history.

(56) References Cited

U.S. PATENT DOCUMENTS

| | | | |
|---|---|---|---|
| 5,815,604 A * | 9/1998 | Simons et al. ................. | 382/250 |
| 6,731,684 B1 * | 5/2004 | Wu .......................... | 375/240.12 |
| 7,020,203 B1 | 3/2006 | Horowitz et al. | |
| 7,110,450 B1 | 9/2006 | Kimoto | |
| 8,422,555 B2 * | 4/2013 | Wang et al. ............... | 375/240.12 |
| 2006/0078051 A1 | 4/2006 | Liang et al. | |
| 2011/0026597 A1 | 2/2011 | Tanaka et al. | |
| 2012/0308151 A1 * | 12/2012 | Tatsuka et al. ................. | 382/238 |

FOREIGN PATENT DOCUMENTS

| | | |
|---|---|---|
| JP | 6 98295 | 4/1994 |
| JP | 2000 201354 | 7/2000 |
| JP | 2004 215252 | 7/2004 |
| JP | 2008 516561 | 5/2008 |
| JP | 2011 35444 | 2/2011 |

OTHER PUBLICATIONS

U.S. Appl. No. 13/575,373, filed Jul. 26, 2012, Hasegawa, et al.

(Continued)

*Primary Examiner* — Amir Alavi
(74) *Attorney, Agent, or Firm* — Oblon, Spivak, McClelland, Maier & Neustadt, L.L.P.

(57) ABSTRACT

An image coding apparatus calculates the activity of each macroblock. All the macroblocks of block lines are set as intra-candidate macroblocks (intra-candidate MBs) which are candidates for intra coding. Every other macroblock is set as an intra-candidate MB in block lines. One of the intra-candidate MBs in each block line, which has the minimum activity, is determined as an intra macroblock of a frame. The macroblock determined as the intra MB is changed from the intra-candidate MB to an intra-forbidden macroblock. After changing the setting of the intra-candidate MBs, intra macroblocks are determined for a frame inputted subsequent to the frame.

5 Claims, 9 Drawing Sheets

(56) References Cited

OTHER PUBLICATIONS

"MPEG-2 video—MPEG-2 Chapter 3," Technical Guide for MPEG Technologies, Pioneer, Total 6 Pages (Dec. 10, 2009) (with English translation).

"7-1 compression coding," Proceedings of Standards and Technology, Japanese Patent Office, Total 16 Pages (Dec. 10, 2009) (with English translation).

International Search Report Issued Mar. 1, 2011 in PCT/JP11/50123 Filed Jan. 6, 2011.

* cited by examiner

FIG. 3C

AFTER DETERMINATION OF INTRA MBS IN FRAME F1

| BLOCK LINE | | | | | | |
|---|---|---|---|---|---|---|
| BL1 | M0 | M1 | M2 | M3 | M4 | M5 |
| BL2 | M6 | M7 | M8 | M9 | M10 | M11 |
| BL3 | M12 | M13 | M14 | M15 | M16 | M17 |
| BL4 | M18 | M19 | M20 | M21 | M22 | M23 |

☐ INTRA-CANDIDATE MB  ▨ INTRA-FORBIDDEN MB

FIG. 3D

IN DETERMINATION OF INTRA MBS IN FRAME F2

| BLOCK LINE | | | | | | |
|---|---|---|---|---|---|---|
| BL1 | M0 ACT=38 | M1 ACT=29 | M2 ACT=96 | M3 ACT=85 | M4 ACT=120 | M5 ACT=34 |
| BL2 | M6 ACT=121 | M7 ACT=75 | M8 ACT=114 | M9 ACT=54 | M10 ACT=36 | M11 ACT=26 |
| BL3 | M12 ACT=96 | M13 ACT=41 | M14 ACT=24 | M15 ACT=22 | M16 ACT=61 | M17 ACT=108 |
| BL4 | M18 ACT=69 | M19 ACT=11 | M20 ACT=88 | M21 ACT=37 | M22 ACT=47 | M23 ACT=53 |

☐ INTRA-CANDIDATE MB  ▨ INTRA-FORBIDDEN MB  ▦ INTRA MB

FIG. 4A

AFTER DETERMINATION OF INTRA MBS IN FRAME F3

| BLOCK LINE BL1 | M0 | M1 | M2 | M3 | M4 | M5 |
|---|---|---|---|---|---|---|
| BLOCK LINE BL2 | M6 | M7 | M8 | M9 | M10 | M11 |
| BLOCK LINE BL3 | M12 | M13 | M14 | M15 | M16 | M17 |
| BLOCK LINE BL4 | M18 | M19 | M20 | M21 | M22 | M23 |

☐ INTRA-CANDIDATE MB  ▨ INTRA-FORBIDDEN MB

FIG. 4B

AFTER RECOVERY OPERATION (IN DETERMINATION OF INTRA MBS)

| BLOCK LINE BL1 | M0 | M1 | M2 | M3 | M4 | M5 |
|---|---|---|---|---|---|---|
| BLOCK LINE BL2 | M6 | M7 | M8 | M9 | M10 | M11 |
| BLOCK LINE BL3 | M12 | M13 | M14 | M15 | M16 | M17 |
| BLOCK LINE BL4 | M18 | M19 | M20 | M21 | M22 | M23 |

☐ INTRA-CANDIDATE MB  ▨ INTRA-FORBIDDEN MB

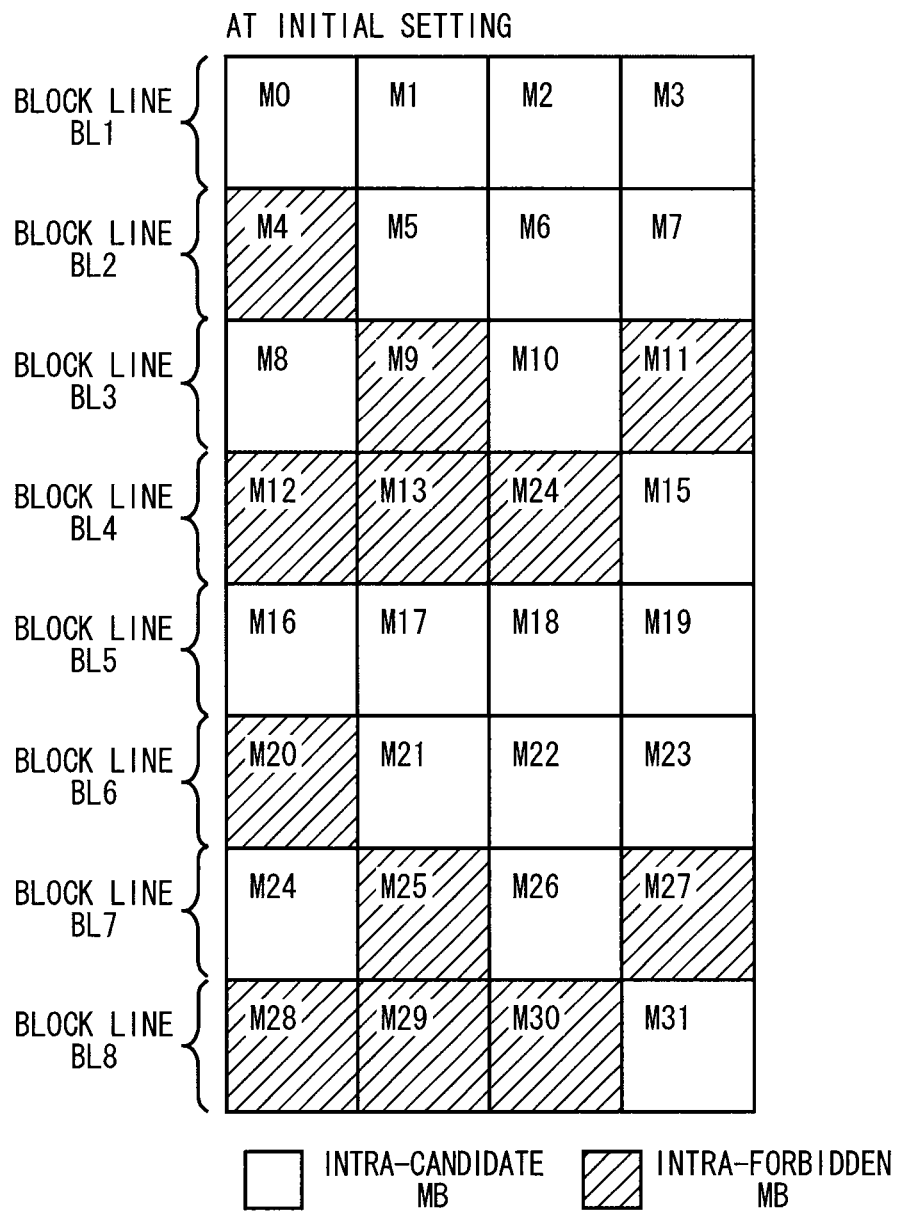

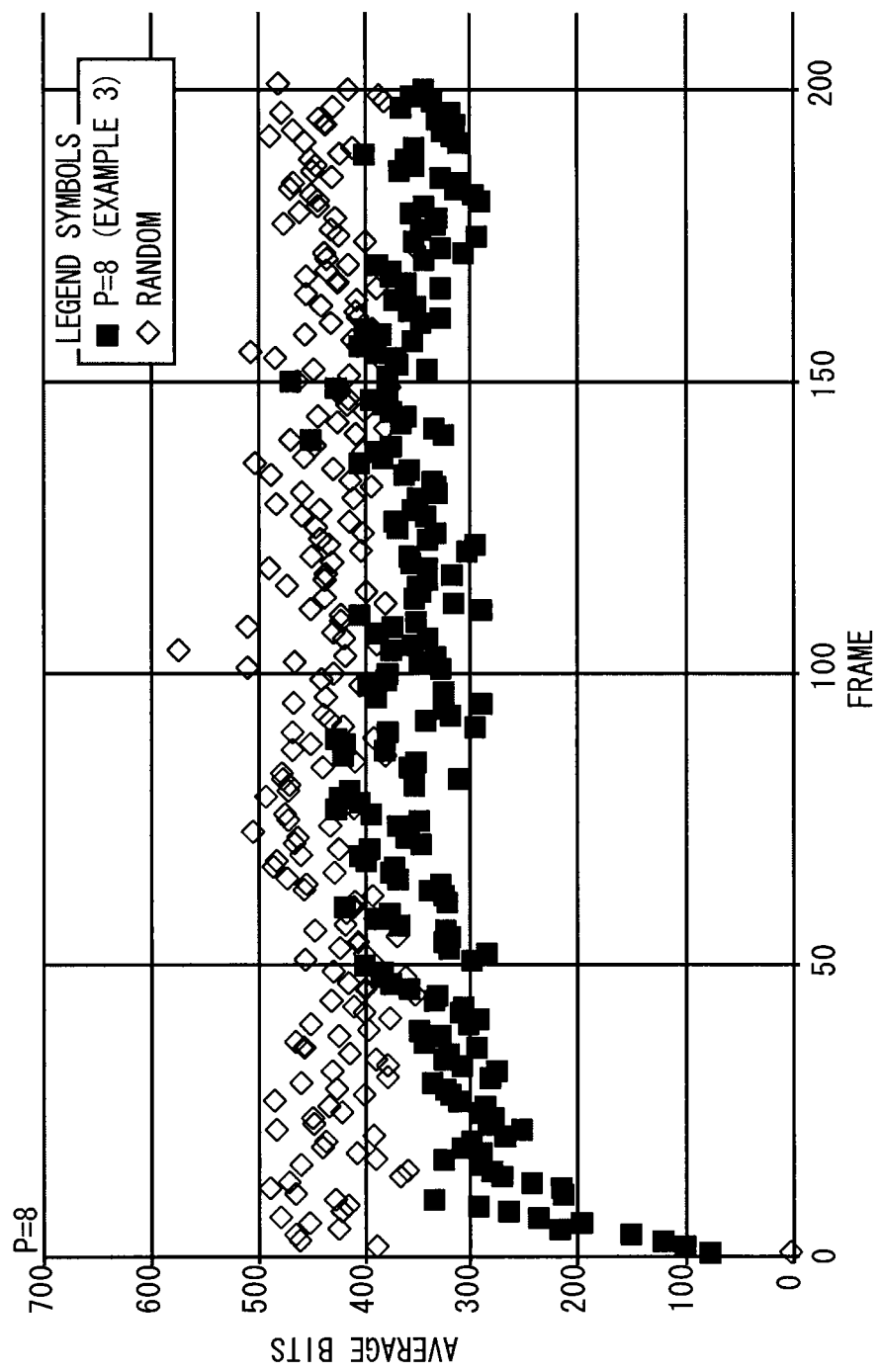

IMAGE CODING APPARATUS

This application is a 371 of PCT/JP11/50123 filed on Jan. 6, 2011.

TECHNICAL FIELD

The present invention relates to an apparatus for coding images to generate compressed images, and more particularly to an apparatus which uses an intra coding process and an inter coding process to code images.

BACKGROUND ART

In image coding techniques such as MPEG2, H. 264, and the like, an intra coding process and an inter coding process are used. In the intra coding process, coding is completed within a frame to be coded, without using any reference frame. In the inter coding process, coding for a frame to be coded is performed by using a reference frame.

All macroblocks included in an I picture are coded by the intra coding process. Macroblocks included in a P picture and a B picture are coded by the inter coding process. Since all the macroblocks in the I picture are intra-coded, the amount of generated codes in the I picture is larger than that in the P picture or the B picture. Even in the H.264 where an intra prediction technique is used, the amount of generated codes in the I picture is still larger than that in the P picture or the B picture.

In a system in which low-delay reproduction or transmission is required, an increase in the amount of generated codes in the I picture becomes a problem. Further, there is another problem that the amount of generated codes oscillates in a cycle of appearance of the I picture. When the amount of generated codes oscillates, a larger buffer size is temporarily needed, which is inefficient.

PRIOR-ART DOCUMENTS

Patent Documents

[Patent Document 1] Japanese Patent Application Laid Open Gazette No. 2004-215252
[Non-Patent Document 1] Technical Guide for MPEG technologies in the homepage of Pioneer Corporation, searched on Dec. 10, 2009, <URL: http://pioneer.jp/crdl/tech/mpeg/3-2.html>
[Non-Patent Document 2] Reference Room in the homepage of Japan Patent Office, searched on Dec. 10, 2009, <URL: http://www.jpo.go.jp/shiryou/s_sonota/hyoujun_gijutsu/nle/nle-7-1.html>

As discussed above, an image including an I picture in which all macroblocks in a frame are intra-coded is not appropriate for a low-delay system since there is a possibility of causing a delay in the processing of the I picture. Then, proposed is a coding method shown in Non-Patent Document 1.

In Non-Patent Document 1, no I picture in which all macroblocks in a frame are intra-coded is used. In Non-Patent Document 1, intra macroblocks are arranged on a slice-by-slice basis. All macroblocks in a slice within a frame are coded as intra macroblocks to be directly subjected to DCT without using any prediction. Such a slice is termed an "intraslice". By shifting a place to which the intraslice is applied on a frame-by-frame basis, the intraslice makes the rounds of the whole screen in a certain cycle and the screen is thereby refreshed. Since the amount of generated codes required for the intraslice is smaller than that required for the I picture, it is possible to reduce the buffer size and decrease the delay.

Also in Non-Patent Document 2, similarly, disclosed is a technique using the intraslice.

As disclosed in Non-Patent Documents 1 and 2, with the intraslice, it is possible to disperse intrablocks in a GOP (Group of Pictures).

The methods disclosed in the above-discussed Non-Patent Documents, however, in which all the macroblocks in a slice are intra-coded and the position of the intraslice is shifted by one row on a frame-by-frame basis, causes degradation in image quality. Specifically, when images are reproduced in series, the intraslices disadvantageously appear like scan lines.

In the above-discussed Patent Document 1, the intra macroblocks are dispersed on a macroblock-by-macroblock basis. In a case where the intra macroblock is a complicated image, however, the amount of codes in the intra macroblock tends to increase. In order to suppress the amount of codes in the intra macroblock, the intra macroblock may be quantized coarsely. In a case of coarsely quantizing the intra macroblock, there arises a difference between the image quality of the intra macroblock and the image quality of an inter macroblock positioned around the intra macroblock. As a result, the positions of the intra macroblocks are disadvantageously noticeable.

DISCLOSURE OF INVENTION

The present invention is intended for an image coding apparatus. The image coding apparatus comprises an activity calculation configured to calculate activity which indicates the complexity of an image of a first frame in a macroblock, an intra-candidate setting configured to set intra-candidate macroblocks which can be intra-coded in the first frame for each of lines of macroblocks aligned in a transverse direction, an intra macroblock determination part configured to determine one of the intra-candidate macroblocks of the first frame included in each line, which has the minimum activity, as an intra macroblock of the first frame, and a coding part configured to intra-code the intra macroblock.

It is possible to prevent the amount of codes in the intra macroblocks for one frame from sharply increasing.

In the image coding apparatus, a second frame is a frame inputted subsequent to the first frame, and the intra-candidate setting part excludes the macroblock having the minimum activity from intra-candidate macroblocks of the second frame.

Since the intra macroblocks are dispersedly disposed among the frames, the positions of the intra macroblocks become unnoticeable.

Therefore, it is an object of the present invention to provide an image coding apparatus which is capable of suppressing a variation in the amount of codes in intra macroblocks for one frame and achieving less degradation in image quality.

These and other objects, features, aspects and advantages of the present invention will become more apparent from the following detailed description of the present invention when taken in conjunction with the accompanying drawings.

BRIEF DESCRIPTION OF DRAWINGS

FIG. 3C is a view showing a distribution of the intra-candidate MBs after an update operation;

FIG. 3D is a view showing a distribution of the intra MBs and the intra-candidate MBs;

FIG. 4A is a view showing a distribution of the intra-candidate MBs;

FIG. 4B is a view showing a distribution of the intra-candidate MBs after a recovery operation;

FIG. 5 is a view showing a distribution of intra-candidate MBs in an initial state in accordance with an exemplary variation of the preferred embodiment of the present invention;

FIG. 8 is a graph showing a variation in the amount of codes in the intra MBs in accordance with Example 3.

PREFERRED EMBODIMENT FOR CARRYING OUT THE INVENTION

Hereinafter, with reference to figures, discussion will be made on a preferred embodiment of the present invention.

<Constitution of Image Coding Apparatus>

Figure 1:
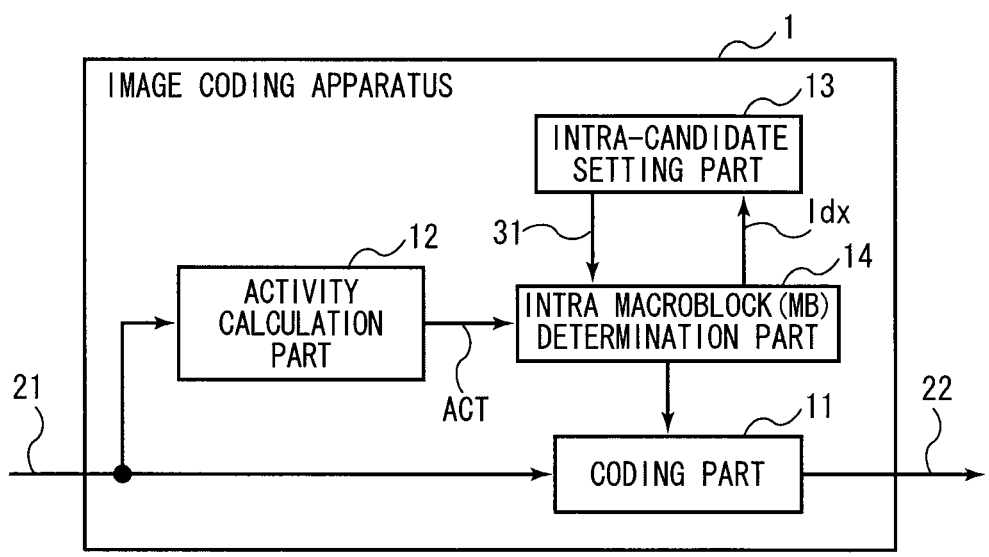
FIG. 1 is a functional block diagram showing a constitution of an image coding apparatus in accordance with a preferred embodiment of the present invention.

FIG. 1 is a functional block diagram showing a constitution of an image coding apparatus 1 in accordance with the present preferred embodiment. The image coding apparatus 1 comprises a coding part 11, an activity calculation part 12, an intra-candidate setting part 13, and an intra macroblock determination part 14. Hereinafter, the intra macroblock determination part 14 is referred to as an "intra MB determination part 14" (the abbreviation "MB" stands for macroblock).

The coding part 11 inputs uncompressed image data 21. The coding part 11 performs an image coding process on the input uncompressed image data 21, to thereby output compressed image data 22. The coding part 11 performs the image coding process using a coding system such as MPEG2, H.264, or the like.

The activity calculation part 12 inputs the uncompressed image data 21. The activity calculation part 12 calculates the activity ACT for each of macroblocks of the uncompressed image data 21. The activity ACT is a numerical value indicating the complexity of an image in the macroblock.

The intra-candidate setting part 13 sets intra-candidate macroblocks which can be objects to be intra-coded, for each of block lines. Hereinafter, the intra-candidate macroblock is referred to as an "intra-candidate MB". The block line refers to a strip-like area constituted of the macroblocks aligned in a transverse direction. The intra-candidate setting part 13 holds information on the intra-candidate MBs as MB classification information 31.

The intra MB determination part 14 determinates intra MBs to be disposed in each frame on the basis of the MB classification information 31 and the respective activities ACT of the macroblocks. The intra MB determination part 14 determines one of the intra-candidate MBs included in each of the block lines, which has the minimum activity, as the intra MB. Since one intra MB is disposed for each block line, the intra MBs are dispersedly arranged in each frame.

In the present preferred embodiment, when the uncompressed image data 21 is coded, the image coding apparatus 1 does not generate any I picture in which all the intra macroblocks are coded. The image coding apparatus 1 dispersedly arrange the intra MBs in each frame.

<General Outline for Determination of Intra MBs>

Figure 2:
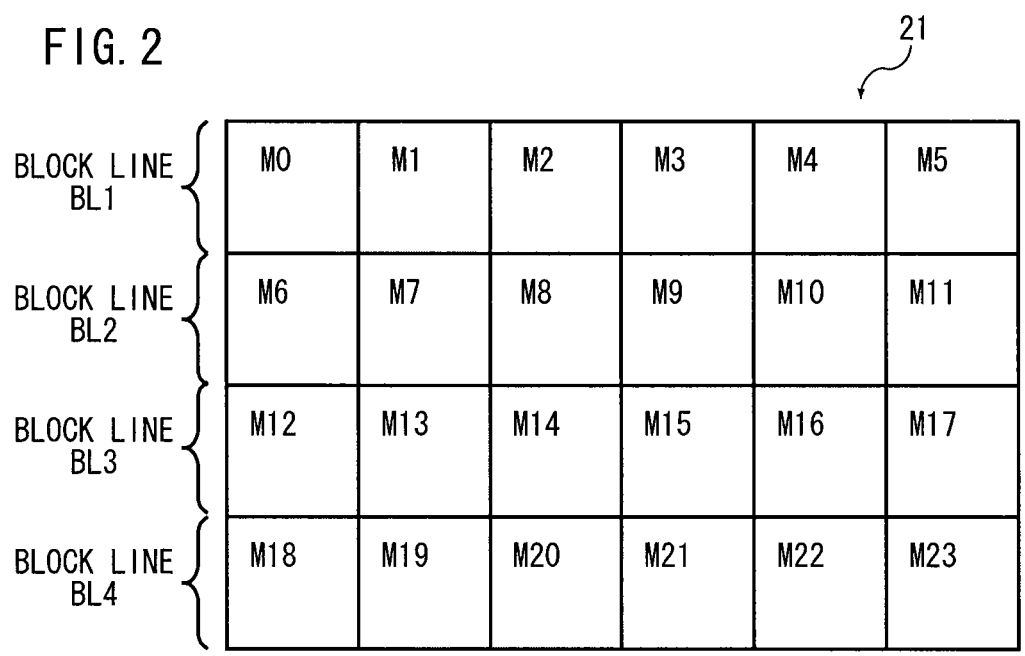
FIG. 2 is a view showing a layout of macroblocks in each frame.

Now, discussion will be made on a general outline of procedures for determination of the intra MBs in each frame. FIG. 2 is a view showing a layout of a frame of the uncompressed image data. As shown in FIG. 2, discussion will be made, taking a case where one frame consists of twenty-four macroblocks M0 to M23 as an example. One frame consists of six macroblocks wide and four macroblocks long. In the frame, block lines BL1 to BL4 are formed.

The image coding apparatus 1 follows the procedures, from (Procedure a) to (Procedure d), to determine the intra MBs in each frame.

(Procedure a) Initial Setting of Intra-Candidate MBs

Initial setting of the intra-candidate MBs is performed before starting the coding of the uncompressed image data 21. The intra-candidate setting part 13 sets intra-candidate MBs for each of the block lines in order to disperse the positions of the intra MBs in each frame.

(Procedure b) Calculation of Activity ACT

The activity calculation part 12 calculates the activity ACT of each of the macroblocks every time when the frame is inputted.

(Procedure c) Determination of Intra MBs

The intra MB determination part 14 determines one intra MB for each block line by using the MB classification information 31 and the calculated activities ACT. Specifically, the intra MB determination part 14 determines one of the intra-candidate MBs in each block line, which has the minimum activity, as the intra MB. Since the macroblock having lower activity ACT is preferentially intra-coded, it is possible to suppress the amount of codes in the intra MB.

(Procedure d) Update of MB Classification Information 31

The intra-candidate setting part 13 changes the macroblocks which are determined as the intra MBs, from the intra-candidate MBs to an intra-forbidden MBs. The intra-forbidden MB refers to a macroblock forbidden from being intra-coded. This updates the MB classification information 31. In the determination of the intra MBs for the next frame, the updated MB classification information 31 is used.

Every time when the frame is inputted, the operations of Procedure b to Procedure d are performed. Detailed discussion on Procedure a to Procedure d will be made, taking a case where the intra MBs in the frame F1 are determined as an example. Subsequent to the frame F1, the frames F2, F3, . . . F6, . . . F12, . . . are inputted sequentially. Hereinafter, the block lines BL1 and BL3 are referred to as "odd-numbered lines". The block lines BL2 and BL4 are referred to as "even-numbered lines".

<Initial Setting of Intra-Candidate MBs (Procedure a)>

Figure 3A:
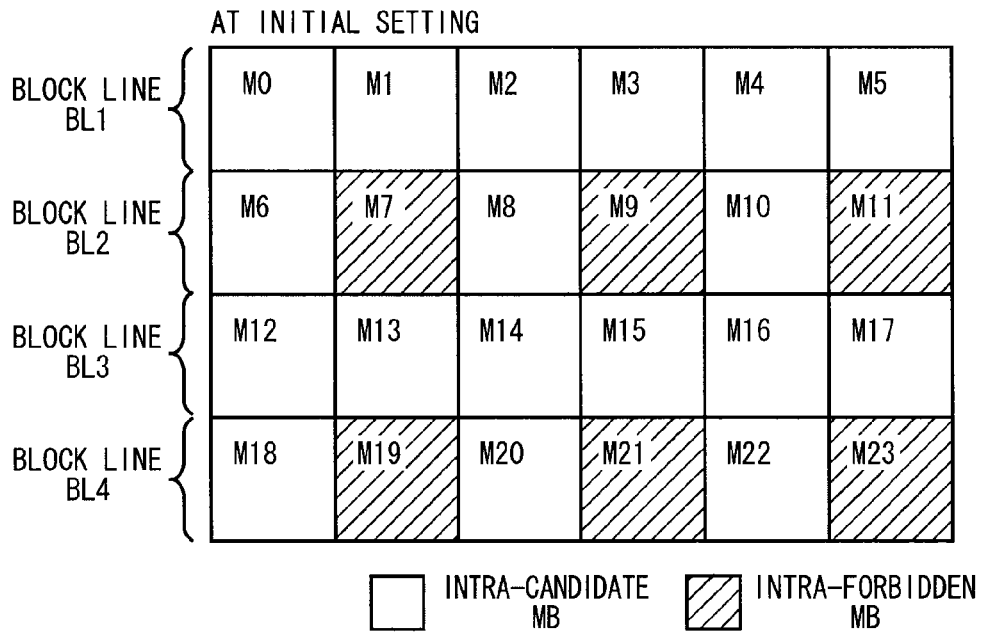
FIG. 3A is a view showing a distribution of macroblocks (intra-candidate MBs) which can be designated as intra macroblocks (intra MBs) in an initial state.

FIG. 3A is a view showing a distribution of the intra-candidate MBs at the initial setting. In FIG. 3A, the intra-candidate MBs are shown in white and the intra-forbidden MBs are hatched.

In the block line BL1, the macroblocks M0 to M5 are set as the intra-candidate MBs. In block line BL2, the macroblocks M6, M8, and M10 are set as the intra-candidate MBs. In block line BL3, the macroblocks M12 to M17 are set as the intra-candidate MBs. In block line BL4, the macroblocks M18, M20, and M22 are set as the intra-candidate MBs.

At the initial setting, all the macroblocks in the odd-numbered lines are set as the intra-candidate MBs. At the initial setting, in the even-numbered lines, every other macroblock is set as the intra-candidate MB. The intra-candidate MBs are set so that the block line in which the ratio of the intra-candidate MBs is 100% and the block line in which the ratio of the intra-candidate MBs is 50% are alternately repeated. In the even-numbered lines, only if the ratio of the intra-candidate MBs is 50%, every other macroblock does not have to be set as the intra-candidate MB. In other words, the intra-candidate MBs have only to be set so that there is a difference in the ratio of the intra-candidate MBs between a block line and another adjoining block line.

<Calculation of Activity ACT (Procedure b)>

The activity calculation part 12 calculates the activity ACT of each macroblock every time when the frame is inputted. As discussed above, the activity ACT is a numerical value indicating the complexity of an image in the macroblock. The activity calculation part 12 calculates the dispersion of the pixel values of pixels in each macroblock as the activity ACT. As the pixel value, the luminance value of the pixel in the macroblock or the pixel value of each color component can be used.

Only if the value indicates the complexity of the image of each macroblock, the activity calculation part 12 may calculate the activity ACT by using any other calculation method. The sum total of the differential absolute values between the pixel value of any one pixel (specified pixel) in a macroblock and the pixel value of a pixel adjoining the specified pixel on the right side thereof, for example, can be obtained as the activity ACT.

<Determination of Intra MB (Procedure c)>

Figure 3B:
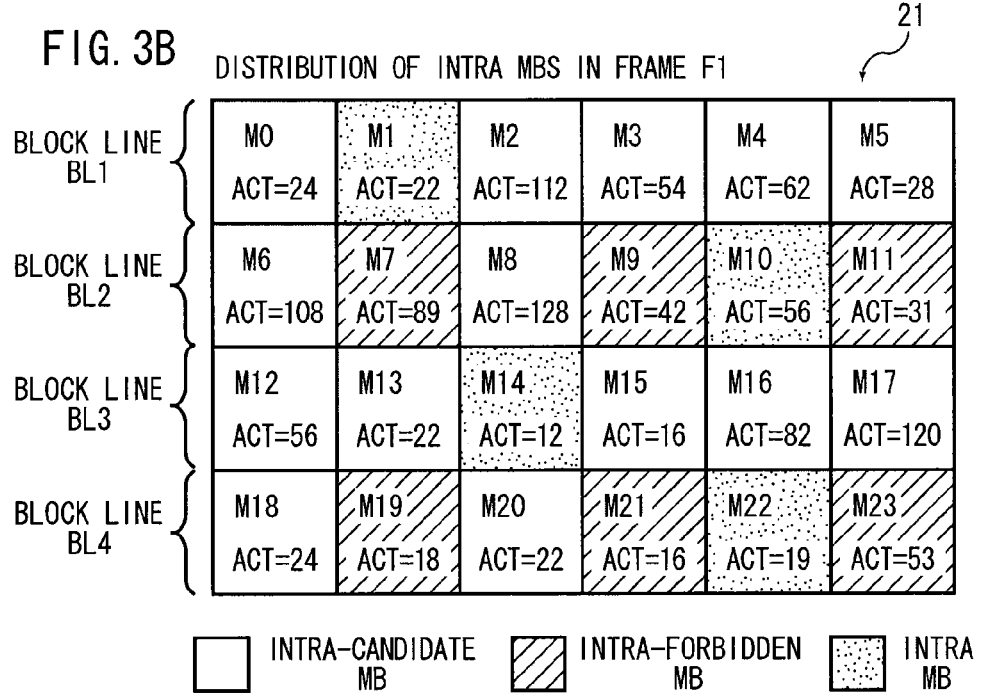
FIG. 3B is a view showing a distribution of the intra MBs and the intra-candidate MBs.

FIG. 3B is a view showing the correspondence between the intra-candidate MB and the activity thereof in the frame F1. The intra MB determination part 14 determines one of the intra-candidate MBs set in each block line, which has the minimum activity ACT, as the intra MB.

In the block line BL1, out of the macroblocks M0 to M5 which are the intra-candidate MBs, the macroblock M1 having the minimum activity ACT is determined as the intra MB. Similarly, in the block lines BL2, BL3, BL4, the macroblocks M10, M14, and M22 are determined as the intra MBs, respectively. In FIG. 3B, the macroblocks M1, M10, M14, and M22 which are determined as the intra MBs are each represented by the sand pattern. It can be seen that one intra MB is disposed in each block line.

In the odd-numbered lines, no intra-forbidden MB is set. Therefore, the macroblock having the minimum activity ACT in each odd-numbered line is determined as the intra MB. In the even-numbered lines, the macroblock having the minimum activity ACT is not always determined as the intra MB. In the block line BL2, for example, the macroblock M10 having the third lowest activity ACT is determined as the intra MB. Since there is a difference in the ratio of the intra-candidate MBs between the odd-numbered lines and the even-numbered lines, the levels of the activity ACT of the intra MB can be dispersed.

By dispersing the levels of the activity ACT of the intra MB between the odd-numbered lines and the even-numbered lines, it is possible to prevent the total amount of codes in the intra MBs included in the frame F1 from becoming much larger than that in the intra MBs included in each of the other frames. The reason thereof will be discussed below.

When the macroblock having high activity ACT (the image thereof is complicated) is coded, usually, the macroblock having a complicated image is coarsely quantized in order to suppress the amount of codes. In the present preferred embodiment, however, when the intra MB having a complicated image is coarsely quantized, there is a possibility that the positions of the intra MBs will become noticeable since there arises a difference between the image quality of the intra MBs and that of inter macroblocks around the intra MBs. For this reason, it is necessary to finely quantize even the intra MB having a complicated image.

When the intra MB having a complicated image and the intra MB having lower activity ACT (a flat image) are quantized with the same coarseness (fineness), the amount of codes in the intra MB having a complicated image is larger than that in the intra MB having a flat image. This is because the quantization value of a high-frequency component is almost zero in the macroblock having a flat image and therefore the amount of codes in the macroblock having a flat image is suppressed.

As discussed above, the image coding apparatus 1 disperses the levels of the activity ACT of the intra MB between the odd-numbered lines and the even-numbered lines. Since this avoids a case where the intra MBs having higher activities ACT are coded at the same time in the odd-numbered line and the even-numbered line, it is possible to prevent the total amount of codes in the intra MBs included in the frame F1 from extremely increasing.

When the frame F1 is coded, the macroblocks M1, M10, M14, and M22 which are determined as the intra MBs are intra-coded. Further, the first frame of the sequence may be an I picture. In this case, from the next frame, the intra MBs are determined in accordance with the above-discussed procedures. This makes it possible to generate the compressed image data 22 from the first frame.

<Update of intra-candidate MBs (Procedure d)>

The intra MB determination part 14 notifies the intra-candidate setting part 13 of respective indexes Idx of the macroblocks M1, M10, M14, and M22 which are determined as the intra MBs of the frame F1. The intra-candidate setting part 13 updates the MB classification information 31 by changing the macroblocks M1, M10, M14, and M22 to the intra-forbidden MBs on the basis of the notified indexes Idx.

FIG. 3C is a view showing a distribution of the intra-candidate MBs after the determination of the intra MBs of the first F1. As shown in FIG. 3C, the macroblocks M1, M10, M14, and M22 which are the intra MBs of the frame F1 are set as the intra-forbidden MBs. Since one macroblock is intra-coded in each block line, the number of the intra-forbidden MBs increases by one every time when the frame is coded. There remains, however, a difference in the ratio of the intra-candidate MBs between the odd-numbered lines and the even-numbered lines.

<Determination of Intra MBs in Frames F2 and F3>

The frame F2 is inputted subsequent to the frame F1. The activity calculation part 12 calculates the activity ACT of each of the macroblocks included in the frame F2 (Procedure b). Since the MB classification information 31 is updated, the intra MBs of the frame F2 are determined out of the intra-candidate MBs shown in FIG. 3C.

FIG. 3D is a view showing the correspondence between the intra-candidate MB and the activity ACT thereof in the frame F2. The intra MB determination part 14 determines the macroblocks M5, M8, M15, and M20 as the intra MBs of the frame F2 in accordance with Procedure c. Since the MB classification information 31 is updated after the intra MBs of the frame F1 are determined, the intra MBs of the frame F1 (macroblocks M1, M10, M14, and M22) are not determined as the intra MBs of the frame F2. Therefore, it is possible to disperse the intra MBs in all the frames.

As shown in FIG. 3D, in the odd-numbered lines, the macroblocks M5 and M15 having activities ACT of lower level to middle level are determined as the intra MBs. In the even-numbered lines, the macroblocks M8 and M20 having activities ACT of middle level to higher level are determined as the intra MBs.

Thus, as the ratio of the intra-candidate MBs in each block line decreases, the activity ACT of the intra MB increases. Since there is a difference in the ratio of the intra-candidate MBs between the odd-numbered lines and the even-numbered lines, however, it is possible to prevent the macroblocks having high activities ACT from being selected as the intra MBs at the same time in the odd-numbered line and the even-numbered line. As discussed above, even in the case where the intra MB having high activity ACT is finely quantized in order to prevent degradation in image quality, it is possible to prevent the total amount of codes in the intra MBs included in one frame from extremely increasing.

With reference to FIG. 3D, the macroblocks M5, M8, M15, and M20 are changed to the intra-forbidden MBs since those macroblocks are determined as the intra MBs of the frame F2 (Procedure d). As a result, the number of intra-candidate MBs in each even-numbered line is one. In the block line BL2, for example, only the macroblock M6 is the intra-candidate MB.

The frame F3 is inputted subsequent to the frame F2. Then, the intra MBs of the frame F3 are determined (Procedure c). Since only the macroblock M6 is the intra-candidate MB in the block line BL2, the macroblock M6 is determined as the intra MB of the frame F3. The macroblock M6 is not always a macroblock having the maximum activity ACT in the block line BL2. In other words, when the intra MBs are determined in accordance with Procedure c, the frequency that the macroblock having the maximum activity ACT in each block line is determined as the intra MB decreases. Therefore, it is possible to prevent the total amount of codes in the intra MBs included in one frame from extremely increasing.

<Recovery Operation>

The macroblocks which are determined as the intra MBs of the frame F3 are changed to the intra-forbidden MBs (Procedure d). Since the macroblock M6 is determined as the intra MB in the block line BL2, all the macroblocks in the block line BL2 are set as the intra-forbidden MBs. The same applies to the block line BL4.

FIG. 4A is a view showing a distribution of the intra-candidate MBs after the determination of the intra MBs in the frame F3. In the even-numbered lines, all the macroblocks are set as the intra-forbidden MBs. Therefore, even when the frame F4 is inputted subsequent to the frame F3, it is impossible to determine any intra MB in the even-numbered lines.

The intra-candidate setting part 13 performs a recovery operation on the even-numbered lines in order to allow the determination of the intra MBs in the even-numbered lines. In the recovery operation, if there is a block line (recovery object line) in which all the macroblocks are set as the intra-forbidden MBs, all the macroblocks in the recovery object line are reset to the intra-candidate MBs.

FIG. 4B is a view showing a distribution of the intra-candidate MBs after the recovery operation. By performing the recovery operation, all the macroblocks in the even-numbered lines are changed from the intra-forbidden MBs to the intra-candidate MBs. The odd-numbered lines still have the macroblocks set as the intra-candidate MBs even after the determination of the intra MBs in the frame F3 (see FIG. 4A). Therefore, the odd-numbered lines are not objects for the recovery operation.

Through the recovery operation, the ratio of the intra-candidate MBs in the even-numbered line becomes 100%. The ratio of the intra-candidate MBs in the odd-numbered line is 50%. The ratio of the intra-candidate MBs in the odd-numbered line and that in the even-numbered line change over from one to another as compared with the initial state. By performing the recovery operation, in the frame F4, the macroblock having activity ACT of middle level is determined as the intra MB in each odd-numbered line, and the macroblock having the minimum activity ACT is determined as the intra MB in each even-numbered line. Even after the recovery operation is performed, it is possible to disperse the activities ACT of the intra MBs between the odd-numbered lines and the even-numbered lines.

The recovery operation for the odd-numbered line is performed after the determination of the intra MBs in the frame F6. Through the recovery operation for the odd-numbered lines, the ratio of the intra-candidate MBs in the odd-numbered lines and that in the even-numbered lines are 100% and 50%, respectively, like in the initial state. At that time, every other macroblock is not necessarily the intra-candidate MB in each of the even-numbered lines. This is because the intra-candidate MB having lower activity ACT is preferentially selected as the intra MB in each of the even-numbered lines.

Specifically, the recovery operation for the odd-numbered lines is performed every time after the intra MBs in the frames F6, F12, F18, . . . are determined, and the recovery operation for the even-numbered lines is performed every time after the intra MBs in the frames F3, F9, F15, . . . are determined. In other words, by setting the intra-forbidden MBs in the even-numbered lines in advance (see FIG. 3A), it is possible to cause the respective timings of performing the recovery operation for the odd-numbered lines and for the even-numbered lines not to coincide with each other.

The macroblocks included in a block line on which the recovery operation is performed are determined as the intra MBs within six frames. An interval (intra interval) at which each macroblock is determined as the intra MB varies in a range from one frame to eleven frames. The intra interval is, generally, in a range from 1 to {(the number of macroblocks in each block line×2)−1}.

Now, discussion will be made on a case where the intra interval is 1. It is assumed that the macroblock M6 included in the block line BL2 is determined as the intra MB of the frame F3. As the recovery operation for the block line BL2 is performed, the macroblock M6 is reset to the intra-candidate MB (see FIGS. 4A and 4B). When the macroblock M6 is determined as the intra MB of the frame F4, since the macroblock M6 is intra-coded successively in the frames F3 and F4, the intra interval is 1.

Next, discussion will be made on a case where the intra interval is 11. It is assumed that the macroblock M1 included in the block line BL1 is determined as the intra MB of the frame F1 (FIG. 3A). The recovery operation for the block line BL1 is performed after the intra MB of the frame F6 is determined. After the recovery operation, there is a possibility that the macroblock M1 is not determined as the intra MB until the frame F12 is inputted. In such a case, the intra interval is 11.

{Variations}

In the above-discussed preferred embodiment, the case has been discussed where there is a difference in the ratio of the intra-candidate MBs in each block line between the odd-numbered lines and the even-numbered lines. By increasing an interval (set interval) at which the ratio of the intra-candidate MBs to be set in each block line is changed, it is possible to further suppress a variation in the total amount of codes in the intra MBs included in one frame.

FIG. 5 is a view showing an initial state of the intra-candidate MBs in a case where the ratio of the intra-candidate MBs is changed at intervals of four blocks. In this exemplary variation, discussion will be made, taking a case where one frame consists of 32 macroblocks M0 to M31 in the uncompressed image data 21. One frame consists of four macroblocks wide and eight macroblocks long.

The set interval is assumed to be "P". In the exemplary case of FIG. 5, the set interval P is 4. In the example discussed in the above preferred embodiment (see FIG. 3A), the set interval P is 2. The value of the set interval P may be any value other than 2 or 4. The maximum value of the set interval P is the number of block lines in the uncompressed image data 21.

In the block lines BL1 and BL5, the ratio of the intra-candidate MBs is 100%. In the block lines BL2 and BL6, the ratio of the intra-candidate MBs is 75%. In the block lines BL3 and BL7, the ratio of the intra-candidate MBs is 50%. In the block lines BL4 and BL8, the ratio of the intra-candidate MBs is 25%.

Thus, in the block lines BL1 to BL8, by changing the ratio of the intra-candidate MBs every four block lines, the activities ACT of the intra MBs to be selected for all the block lines can be further dispersed as compared with the above-discussed preferred embodiment. Since the frequency that the macroblocks having activities ACT of higher level are determined as the intra MBs is decreased by increasing the set interval P, it is possible to further suppress the variation in the amount of codes in the intra MBs for each frame.

By increasing the set interval P, the frequency that the macroblocks having the activities ACT of lower level are determined as the intra MBs is also decreased. Even in a case where a moving object having low activity ACT moves, for example, it is possible to prevent the moving object from being preferentially intra-coded. Since successive intra-coding of the moving object and successive intra-coding of a background are prevented, it is possible to prevent the position of the moving object from becoming noticeable.

EXAMPLES

Figure 6:
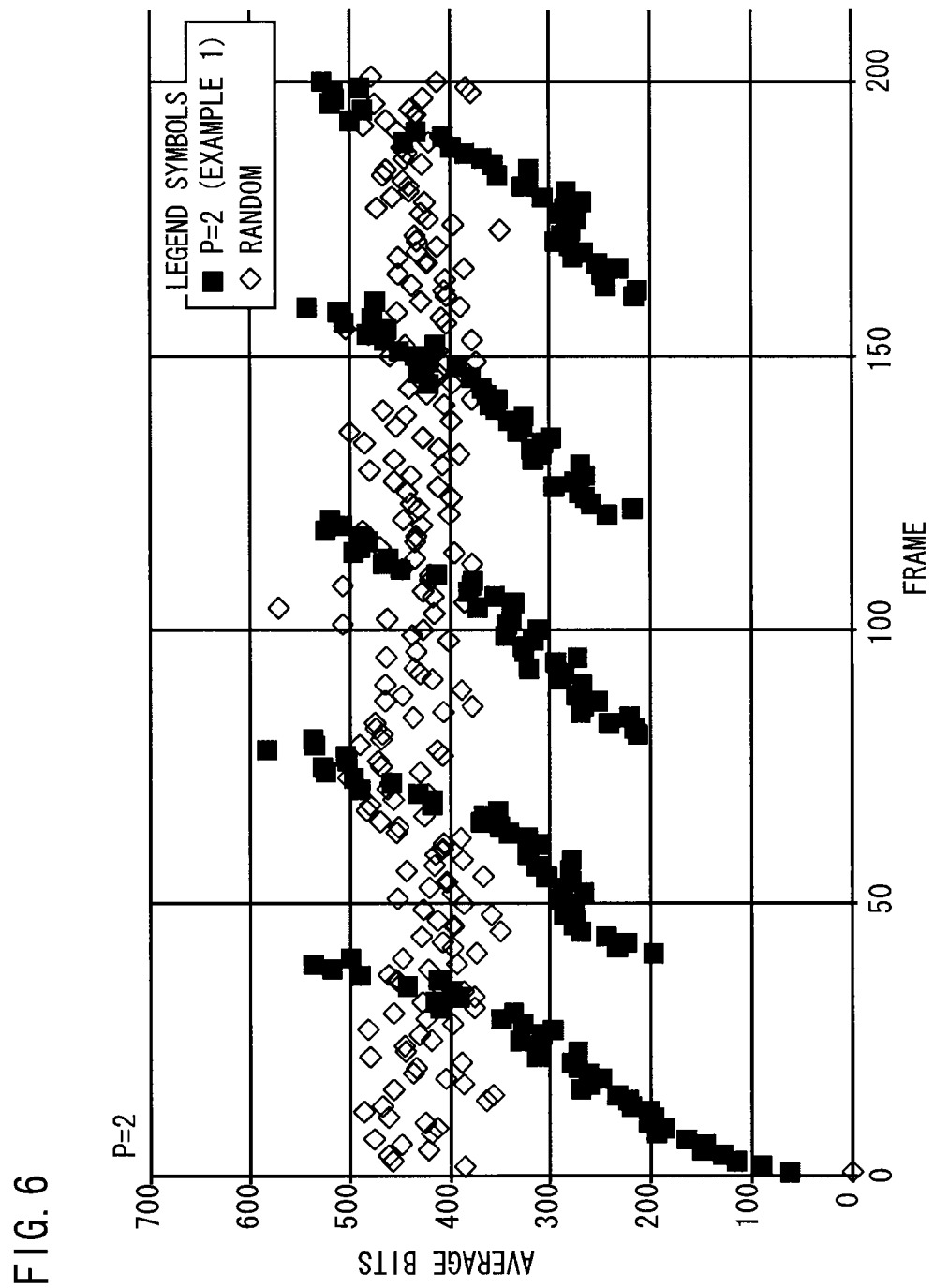
FIG. 6 is a graph showing a variation in the amount of codes in the intra MBs in accordance with Example 1.
Figure 7:
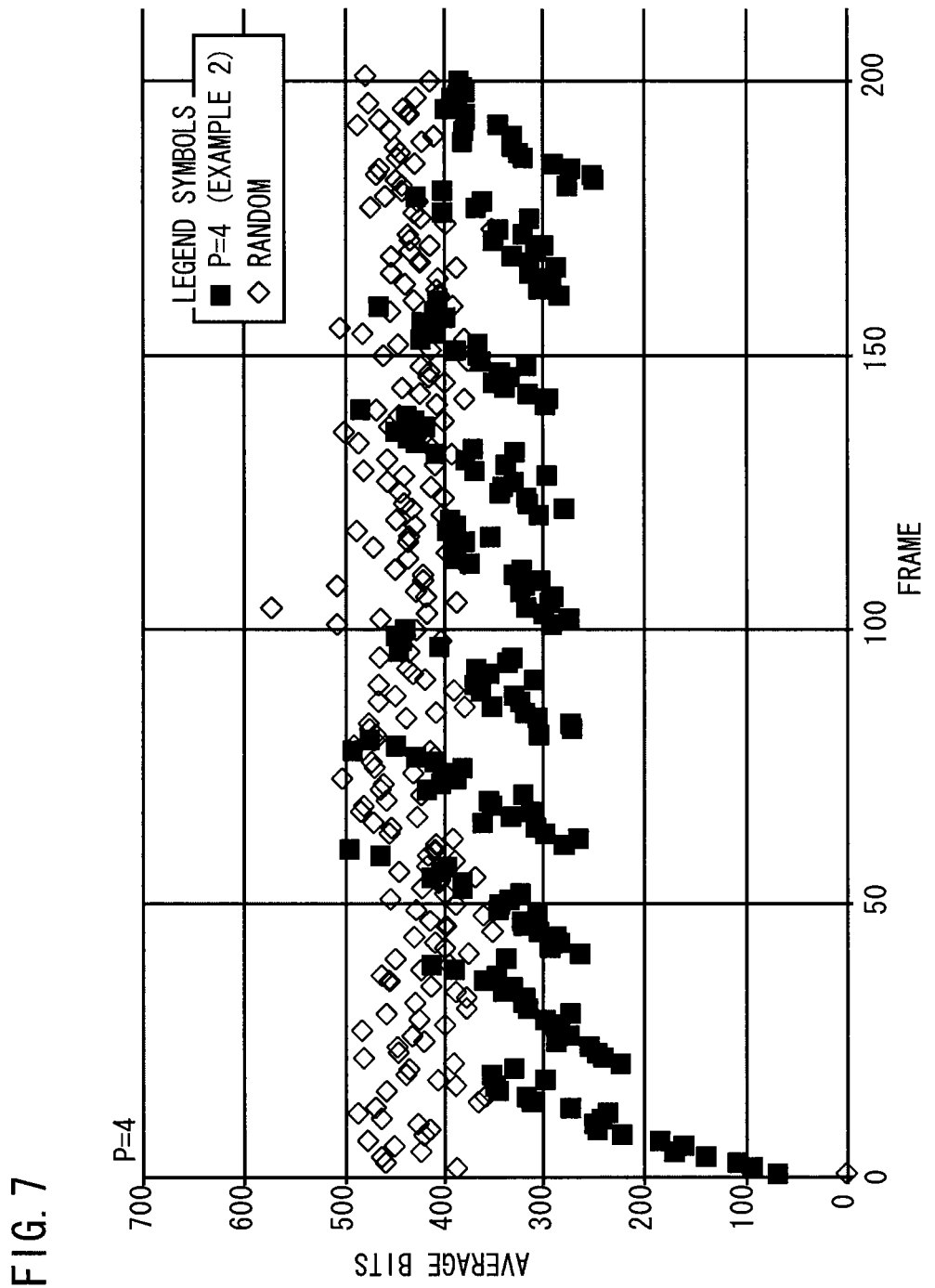
FIG. 7 is a graph showing a variation in the amount of codes in the intra MBs in accordance with Example 2.

Hereinafter, discussion will be made on Examples where the uncompressed image data 21 is coded by using the above-discussed image coding apparatus 1, with the value of the set interval P changed. FIGS. 6 to 8 are graphs each showing a variation in the average amount of codes in the intra MBs arranged in each frame.

FIG. 6 is a graph showing a variation in the average amount of codes in the intra MBs in a case where the intra-candidate MBs are initially set with the set interval P=2 (Example 1). Though the size of the image is different, the intra-candidate MBs are set in the initial setting as shown in FIG. 3A. The horizontal axis represents the frame No. and the vertical axis represents the average amount of codes in the intra MBs of each frame. As a comparative example, shown is the average amount of codes in the intra MBs of each frame in a case where the intra MBs of each frame are arranged randomly.

In Example 1 and the comparative example, no I picture is used and the intra MBs are dispersedly arranged in each frame. For this reason, though not shown, a variation in the amount of codes among the frames is suppressed as compared with a case where I pictures are used.

As shown in FIG. 6, the average amount of codes in Example 1 repeatedly increases and decreases every forty frames. This is because the recovery operation is performed every forty frames. While the average amount of codes varies in a range of 350 to 600 bits in the comparative example, the average amount of codes varies in a range of 100 to 600 bits in Example 1. Therefore, it can be seen that the average amount of codes in the intra MBs in a whole sequence is further suppressed in Example 1 as compared with that in the comparative example.

FIG. 7 is a graph showing a variation in the average amount of codes in the intra MBs in a case where the intra-candidate MBs are initially set with the set interval P=4 (Example 2). In the initial state, the intra-candidate MBs are arranged as shown in FIG. 5.

As shown in FIG. 7, the average amount of codes in Example 2 repeatedly increases and decreases every twenty frames. This is because the recovery operation is performed every twenty frames. While the average amount of codes varies in a range of 350 to 600 bits in the comparative example, the average amount of codes varies in a range of 100 to 500 bits in Example 2. Since the average amount of codes in Example 2 varies in a lower level as compared with that in the comparative example 1, it can be seen that the average amount of codes in the intra MBs in a whole sequence is further suppressed in Example 2 as compared with that in the comparative example 1.

FIG. 8 is a graph showing a variation in the average amount of codes in the intra MBs in a case where the intra-candidate MBs are initially set with the set interval P=8 (Example 3). In the initial state, the intra-candidate MBs are set so that the ratio of the intra-candidate MBs is changed every eight block lines.

When the set interval P=8, the recovery operation is performed every ten frames, but the increase and decrease in the average amount of codes in Example 3 is not as clear as those in Examples 1 and 2. While the average amount of codes varies in a range of 350 to 600 bits in the comparative example, the average amount of codes varies in a range of 100 to 400 bits in Example 3. Since the average amount of codes in Example 3 varies in a lower level as compared with that in the comparative example 1, it can be seen that the average amount of codes in the intra MBs in a whole sequence is further suppressed in Example 3 as compared with that in the comparative example 1.

As shown in FIGS. 6 to 8, as the set interval P increases, the average amount of codes in the intra MBs varies in a lower level. Further, it can be seen that a variation in the average amount of codes in the intra MBs decreases as the set interval (set cycle) P increases.

While the invention has been shown and described in detail, the foregoing description is in all aspects illustrative and not restrictive. It is therefore understood that numerous modifications and variations can be devised without departing from the scope of the invention.

The invention claimed is:

1. An image coding apparatus comprising:
   an activity calculation part configured to calculate activity which indicates a complexity of an image of a first frame in a macroblock;
   an intra-candidate setting part configured to set intra-candidate macroblocks which can be intra-coded in the first frame for each of lines of macroblocks aligned in a transverse direction;
   an intra macroblock determination part configured to determine one of the intra-candidate macroblocks of the first frame included in the each line, which has a minimum activity, as an intra macroblock of the first frame; and
   a coding part configured to intra-code the intra macroblock.

2. The image coding apparatus according to claim 1, wherein
   a second frame is a frame inputted subsequent to the first frame, and the intra-candidate setting part excludes the macroblock having the minimum activity from intra-candidate macroblocks of the second frame.

3. The image coding apparatus according to claim 2, wherein
the intra-candidate setting part resets all macroblocks included in a first line among the lines as the intra-candidate macroblocks of the second frame when the all macroblocks are excluded from the intra-candidate macroblocks of the second frame.

4. The image coding apparatus according to claim 1, wherein
the lines include:
a first line; and
a second line adjoining the first line, and
a ratio of the intra-candidate macroblocks set in the first line is different from that of the intra-candidate macroblocks set in the second line.

5. The image coding apparatus according to claim 4, wherein
a ratio of the intra-candidate macroblocks in each of the lines is changed at regular intervals.

\* \* \* \* \*